United States Patent Office 3,174,329
Patented Mar. 23, 1965

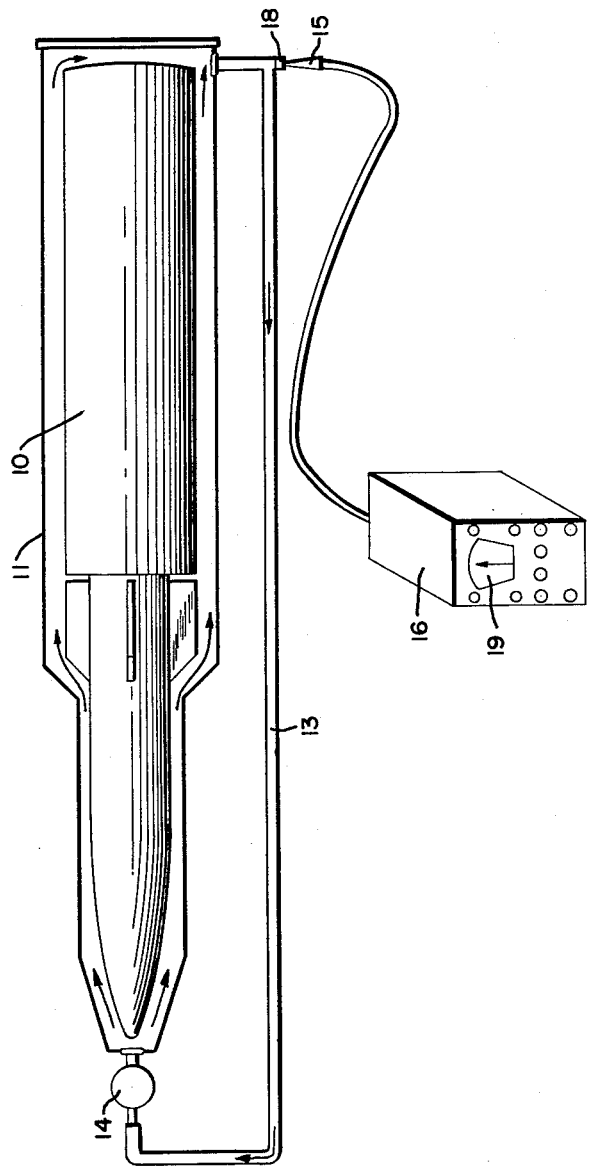

3,174,329
METHOD FOR TESTING ORDNANCE SEALS
Samuel H. Kauffman, Silver Spring, and Frederick D. Vogel, Adelphi, Md., assignors to the United States of America as represented by the Secretary of the Navy
Filed Aug. 14, 1962, Ser. No. 217,784
4 Claims. (Cl. 73—40.7)
(Granted under Title 35, U.S. Code (1952), sec. 266)

The invention described herein may be manufactured and used by or for the Government of the United States of America for governmental purposes without the payment of any royalties thereon or therefor.

This invention relates to a method for leak testing pressure vessels, and more particularly to a method for making quantitative determinations of the leak rates of large pressure vessels.

In the past many methods have been proposed for determining the fluid integrity of pressure vessels. For example, (1) pressure vessels have been placed in a test chamber which was subsequently evacuated and then checks were made to determine the loss of vacuum in the test chamber as a measure of leakage, (2) pressure vessels have been charged to a super atmospheric pressure with a suitable gas and then checked for loss of internal pressure, (3) pressure vessels have been charged to a super atmospheric pressure and then placed under water and visually checked for the escape of gas bubbles, (4) pressurized units have been coated with a wetting agent and checked for the formation of bubbles (5) pressure vessels have been subjected to external hydrostatic pressure and then opened and checked for the presence of water, and (6) pressure vessels have been charged with a tracer gas and then a manual search performed for each seal with detector equipment. While the foregoing methods have been capable of obtaining reasonably satisfactory results, each of the foregoing methods contains certain inherent defects. For example, referring to the aforementioned methods by number, (1) the vacuum test requires a long test period and the results of this test are seriously affected by out-gassing from the surfaces of the test structure and test chamber, (2) in order to detect extremely small leaks with this test, it is necessary to obtain temperature equilibrium since pressure varies directly with temperature; this requires a facility to control temperature and necessitates a long test period, (3) this test necessitates the use of a large water tank for testing large pressure vessels and is incapable of detecting extremely small leaks, (4) this method is incapable of detecting extremely small leaks due to bubble sizes, (5) this method requires that the pressure vessel be opened to complete the test and then resealed and there is no way of insuring that the seals will be as good a fit upon resealing, and (6) the test time for this method depends on the number and length of the seals and the results obtained depend on the qualification and thoroughness of the operator.

The general purpose of the present invention is to provide a testing method that embraces all the advantages of the prior art methods while possessing none of the aforedescribed disadvantages.

It is therefore a primary object of the present invention to provide a new and improved method for leak testing of pressure vessels.

It is another object of the present invention to provide a leak testing method with which extremely small leaks can be detected.

It is a further object of this invention to provide a new and improved leak testing method which will provide quantitative measurements of the leak rate of pressure vessels in addition to detecting the existence of leaks.

It is yet another object of this invention to provide a leak testing method with which extremely small leaks can be detected over a very short period of time.

It is yet a further object of the present invention to provide a leak testing method capable of producing very accurate results independent of operator thoroughness while performing the test.

With these and other objects in view, the present invention contemplates a method including the steps of charging a pressure vessel to a super atmospheric pressure with a Freon gas and then placing the pressure vessel within a closed test chamber which closely surrounds the pressure vessel and provides a small clearance volume therebetween. The air within the test chamber is then continuously circulated, by means of a blower and a recirculating air duct connected to opposite ends of the chamber, to insure thorough mixing of any escaping Freon with the air. After a few minutes, the air stream is analyzed by inserting a test probe of a halogen detector into the recirculating air duct and this analysis is used to compute a quantitative leak rate of the pressure vessel. Alternatively, the halogen detector may be calibrated to read the quantitative leak rate directly.

Other objects, advantages and novel features of the invention will become readily apparent upon consideration of the following detailed description when read in conjunction with the accompanying drawing in which the single figure is a schematic representation of an arrangement of apparatus suitable for practicing the method of the present invention.

In the drawing, 10 represents a piece of underwater ordnance. As may be readily appreciated, underwater ordnance items must be watertight since they are exposed for varying periods of time to hydrostatic pressures, and in some cases to extreme hydrostatic pressures. In order to check the fluid integrity of these items, it is necessary that certain criteria be established which will indicate acceptability of the items being tested. One standard which is frequently used is that a leak that passes no more than one ounce of Freon-12 per year ($1.8 \times 10^{-4}$ cc./sec.) is sufficiently small that it will not leak water. Using this criteria, the items of underwater ordnance may be tested.

The pressure vessel or ordnance item 10 is first charged to a pressure of approximately 15 p.s.i.g. with Freon-12 and it is then placed within a suitable enclosure or test chamber 11. The shape of the enclosure 11 conforms generally and closely to the configuration of the pressure vessel 10 and may be made of flexible plastic material so that the enclosure 11 may be collapsed and stored in a small space when not in use. This precludes the need for large permanent test chambers when the items being tested are relatively large. A recirculating air duct 13 is connected between opposite ends of the enclosure 11 and is provided with a blower 14 adjacent one end thereof.

After the enclosure 11 is closed around the pressure vessel 10, the blower 14 is energized by any suitable means (not shown) to circulate the air through enclosure 11 and air duct 13 in the direction indicated by the arrows in the drawing. The rapid circulation of the air through the enclosure 11 and the air duct 13 insures thorough mixing of the air therein with any Freon-12 which may be escaping, through a leak or leaks, from the pressure vessel 10. After a few minutes, a sampling probe 15 of a halogen detector 16 is inserted into an appropriate fitting 18 in the air duct 13 to obtain a sample of the mixture within the duct for analysis. The detector 16 may be any of various commercially available halogen detectors such as the H-5-P halogen detector manufactured by the General Electric Company. Due to the high sensitivity ($1 \times 10^{-8}$ cc./sec.) of these electronic halogen detectors, the period of test may be measured in minutes. The analysis is automatically performed by the detector 16 and the results thereof are indicated with a meter 19 which forms a part of the detector 16. The meter 19 may be calibrated to indicate the amount of Freon-12 present in the mixture in parts per million; from which the quantitative leak rate of the pressure vessel 10 may be computed since the clearance volume within the enclosure 11 is known. Alternatively, the meter 19 may be calibrated to read quantitative leak rates directly by means of an initial calibration using a standard leak. After the desired information has been obtained from the detector 16, the enclosure 11 is then removed from the pressure vessel 10 and may then be collapsed and stored or used to test further pressure vessels 10.

From the foregoing, it will be readily apparent that the present invention provides a new and improved method for detecting extremely small leaks which possesses numerous advantages not found in the prior art. For example, the method of the present invention permits the detection of minute leaks in a much shorter time period than that required for a complete manual search of large articles by permitting any leaks existing to contaminate the confined or trapped volume of air which is then sampled and analyzed at the end of a short period of time. Also, the method of the present invention does not depend on operator thoroughness in performing the test since the detector may be readily provided with various recording devices or visual or aural indicators for indicating excessive leak rates. Further, by using a blower with a collapsible enclosure, accurate results may be obtained with an apparatus which does not require a space much larger than the object being tested and which may be readily stored in a much smaller space.

It is to be understood that the above described arrangement is simply illustrative of a preferred embodiment for practicing the present invention. Numerous other arrangements may be readily devised by those skilled in the art to achieve similar arrangements still embodying the principles of the present invention and falling within the spirit and scope thereof.

What is claimed is:

1. A method of determining the fluid integrity of pressure vessels comprising the steps of charging said pressure vessel with a test gas not normally present in the atmosphere, enclosing said pressure vessel in a test chamber, circulating the air within said test chamber to insure thorough dispersion of any test gas leakage, and analyzing the air within the test chamber after a predetermined period of time to determine whether any detectable amount of test gas is present.

2. The method of claim 1 wherein said test gas is Freon, and the air is analyzed by means of a halogen detector.

3. The method of claim 1 wherein the analysis is quantitative to enable the determination of the quantitative leak rate of said pressure vessel.

4. A method of determining the fluid integrity of pressure vessels comprising the steps of charging the pressure vessel with Freon-12 to a pressure of approximately two atmospheres, enclosing said pressure vessel in a test chamber, circulating the air within said test chamber to insure thorough dispersion in the enclosed air of any Freon-12 which has leaked from said pressure vessel, and analyzing the air within the test chamber after a predetermined period of time by means of a halogen detector to determine whether any Freon-12 is present therein.

References Cited by the Examiner

Radiflo Leak Detection, AEI 1389 (12–57) 5M American Electronics, Inc., Los Angeles, Calif.; received in Patent Office Mar. 28, 1958.

G. E. Pamphlet, Leak Detectors for Locating Leaks in any System or Component Under Pressure or Vacuum, GEA–6817, Instrument Dept. General Electric, Lynn, Mass.; received in Patent Office Sept. 3, 1958.

Oaks, A.E.: "Helium Leak Testing Fuel Rods for the PWR Blanket," Nondestructive Testing, September–October 1960, pp. 319–322.

ISAAC LISANN, *Primary Examiner.*

ROBERT B. HULL, *Examiner.*